United States Patent [19]

Brecht et al.

[11] Patent Number: 4,752,545
[45] Date of Patent: Jun. 21, 1988

[54] POST SEAL AND METHOD OF MANUFACTURE FOR LEAD-ACID BATTERIES

[75] Inventors: William B. Brecht, Hatfield; Sudhan S. Misra, Lansdale, both of Pa.

[73] Assignee: C & D Power Systems, Inc., Plymouth Meeting, Pa.

[21] Appl. No.: 46,797

[22] Filed: May 7, 1987

Related U.S. Application Data

[62] Division of Ser. No. 849,184, Apr. 7, 1986, Pat. No. 4,683,647.

[51] Int. Cl.⁴ .............................................. H01M 2/08
[52] U.S. Cl. .................... 429/181; 429/184; 429/225
[58] Field of Search ............... 429/181, 184, 185, 225, 429/174

[56] References Cited

U.S. PATENT DOCUMENTS

| | | | |
|---|---|---|---|
| 2,892,006 | 6/1959 | Belove | 429/183 |
| 3,340,099 | 9/1967 | Sherfey | 429/184 |
| 3,652,340 | 3/1972 | Sharpe et al. | 429/184 |
| 3,713,896 | 1/1973 | Feldhake | 429/174 |
| 4,076,908 | 2/1978 | Backer et al. | 429/184 |
| 4,091,189 | 5/1978 | Farwer et al. | 429/181 |
| 4,430,396 | 2/1984 | Hayes, Jr. | 429/184 |

FOREIGN PATENT DOCUMENTS

| | | |
|---|---|---|
| 113399 | 10/1983 | European Pat. Off. . |
| 160491 | 11/1985 | European Pat. Off. . |
| 1213904 | 4/1966 | Fed. Rep. of Germany . |
| 1934017 | 6/1970 | Fed. Rep. of Germany . |
| 3230628 | 12/1983 | Fed. Rep. of Germany . |
| 357272 | 11/1905 | France ............................ 429/181 |
| 2112722 | 5/1972 | France . |
| 57103257 | 12/1980 | Japan . |
| 1575280 | 9/1980 | United Kingdom ............... 429/184 |
| 2084390 | 4/1982 | United Kingdom . |
| 2133609 | 7/1984 | United Kingdom . |

*Primary Examiner*—Anthony Skapars

[57] ABSTRACT

A lead-acid battery includes a case having an apertured cover with the aperture being for passage of a terminal post therethrough for electrically connecting electrodes within the battery case to apparatus outside the battery, with the terminal post extending through the aperture. A rubber layer, devoid of rubber fillers and plasticizers, circumferentially surrounds the post at the aperture. A rubber-bonding epoxy polymer is between the rubber layer and the aperture through the case. A method of securely sealing a battery post within an aperture passing through a lead-acid battery case includes the steps of applying a rubber undercoat which is devoid of fillers and plasticizers annularly about the battery post portion which is closest to the aperture when the post is secured with the aperture, positioning the post within and annularly spaced from the aperture with the annular undercoat proximate to the aperture and filling space within the aperture between the annular undercoat and the battery case with a rubber bonding epoxy material thereby bonding to the annular undercoat and to the battery case.

17 Claims, 1 Drawing Sheet

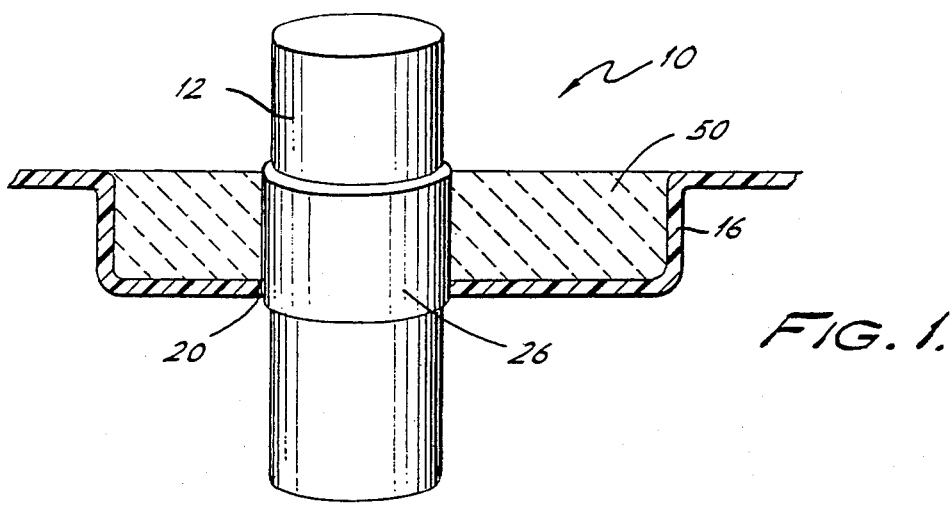
FIG. 1.
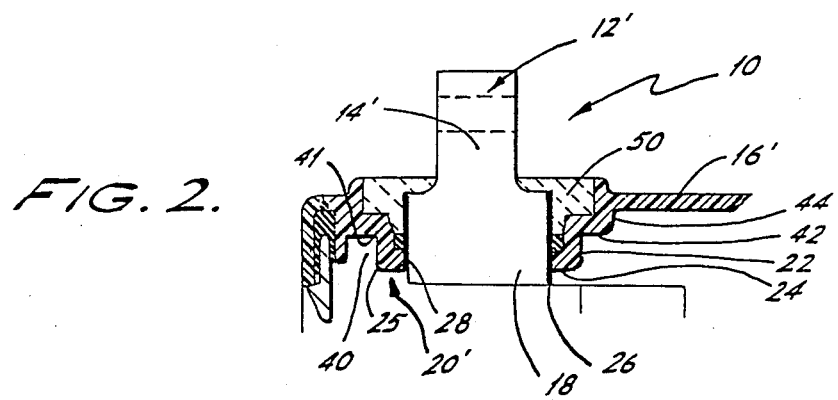
FIG. 2.
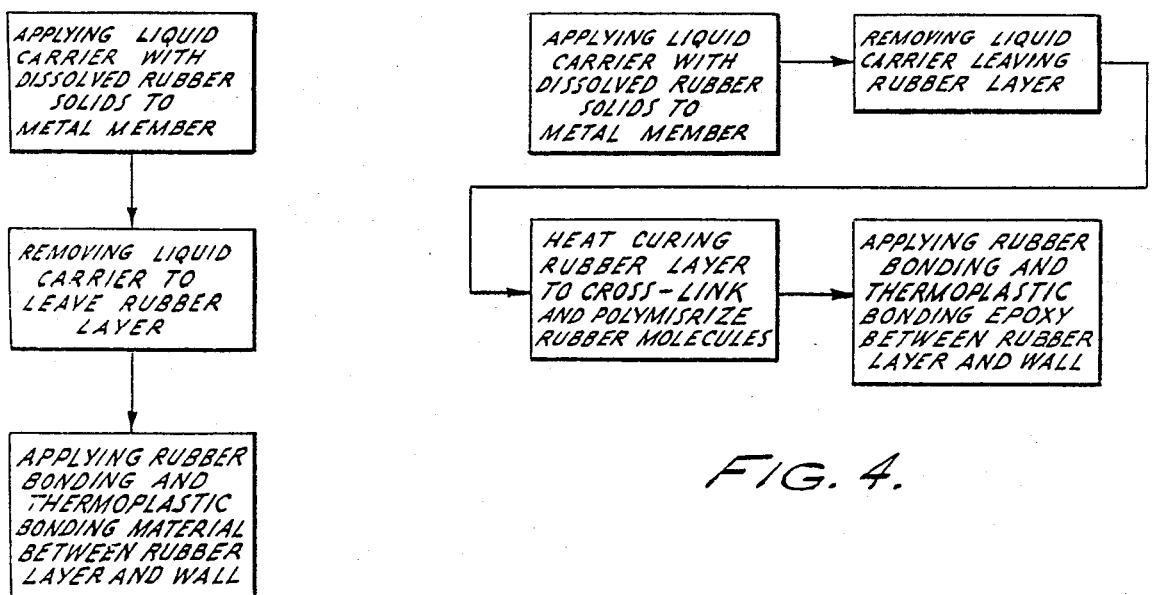
FIG. 3.
FIG. 4.

POST SEAL AND METHOD OF MANUFACTURE FOR LEAD-ACID BATTERIES

This is a division of application Ser. No. 849,184, filed Apr. 7, 1986, now U.S. Pat. No. 4,683,647.

BACKGROUND OF THE INVENTION

1. Field of the Invention

This invention relates generally to batteries and particularly to lead-acid batteries and manufacture thereof. In such batteries liquid acidic electrolyte must be sealed inside the battery case to prevent leakage of the electrolyte from the battery case around a battery post or terminal extending through the case and via which electrical energy is withdrawn from the battery. While the primary thrust of the invention is towards the battery art, particularly the lead-acid battery art, the invention has applicability wherever an electrically conductive, generally metal member must be provided with a liquid-tight seal where the metal member passes through a wall, particularly a wall of an electrically insulative case, containing liquid of high or low pH or an environment otherwise corrosive to conventional sealing materials and techniques.

2. Description of the Prior Art

Mechanical fluid sealing, in the electro-chemical, corrosive environment within a battery, at lead-acid battery terminals or posts, particularly at the positive terminal post or electrode, has presented a serious problem to the battery industry for many years. Post failure structural and/or leakage at the post seal cannot be tolerated.

Over thirty years ago G. W. Vinal, in noting the problem, summarized the seals and techniques which were then used in *Storage Batteries,* published by John Wiley & Sons, Inc., New York, N.Y., copyright 1955. As Vinal observed, "the method of sealing the terminal posts at the point where they pass through the cover is a matter of great importance. Unless the posts are satisfactorily sealed, they are likely to work loose in the cover and cause leakage of the electrolyte."

At that time annular sleeves or flanges were typically used about the battery post to provide a seal between the post and the cover or case. If the case was hard rubber, the sleeve or flange could be force-fitted into place, but only with exercise of great care to avoid damage to the soft lead metal post. Another approach was to fit the post with an externally threaded annular sleeve which threadedly engaged a tapped hole in the hard rubber battery case. Yet another approach was to provide threads on the lead post itself and a tapped hole in the battery case or in an insert fitted into a bore through the battery case. Still another approach was to provide threads on the post with a nut thread-engaging the post and pressing down tightly on the battery case top as the nut was tightened. Sometimes the threaded battery post was further provided with a flange around the post portion inside the battery case; tightly threading the nut on to the post pulled the post flange upwards, into tight engagement with the underside of the case top. A soft gasket could be provided between the flange and the case top as additional structure to protect against electrolyte leakage at the post.

As an alternative to the various thread arrangements, a metal ring, selected from an alloy which was harder than the load post, was burned about the exterior of the post, sealed with grease and urged against a soft gasket positioned between the metal ring and the battery cover exterior. The portion of the post inside the case was then deformed to retain the post in position with the ring squeezing the gasket against the case.

While these constructions have proved less than satisfactory, some of them remain in use even today, for want of a better post seal.

A more recent approach generally disclosed in the *Bell System Technical Journal,* Volume 49, No. 7, page 1405, copyright 1970 and in U.S. Pat. No. 3,652,340 has utilized a "relatively rigid adhesive" epoxy polymer resin coating applied to a clean load post over a large post area (column 2, line 65). The adhesive epoxy polymer coating is surrounded with a shrink-fitted, flexible, inflatable rubber tube which may also be further secured to the adhesive epoxy polymer resin coating by a butyl adhesive (column 3, line 29). The lower portion of the rubber tube forms a bag secured using the butyl adhesive to an annular flange of the battery case surrounding and extending inwardly from the battery case post orifice (column 3, line 38). There may also be provided a rib or dam inside the rubber tube so that the adhesive epoxy polymer resin coating may be applied to the post with the dam serving to limit downward flow of epoxy polymer resin along the post (column 4, line 5). When the rib or dam is used, the tube is not shrink-fitted to the post but is merely positioned about the post prior to pouring the epoxy, to leave a void for the epoxy to occupy; in this case the flexible, inflatable tube acts as a mold for the adhesive epoxy polymer resin coating (column 4, line 4). In either case, the flexible inflatable tube is physically separated from the battery post along the axial length of the flexible, inflatable tube by the adhesive epoxy polymer resin coating; the seal intended to prevent escape of the electrolyte is provided by an adhesive coating between the flexible, inflatable tube and both the post and the battery case. Alternatively, depending upon the design life of the cell, a suitable oxidation resistant grease may be used for the adhesive coating instead of the epoxy resin (column 2, line 74). The parenthetical reference numerals in this paragraph refer to columns and lines in the U.S. Pat. No. 3,652,340.

While the U.S. Pat. No. 4,652,340 approach has had some acceptance, the approach has not proven sufficiently reliable, particularly in small batteries where the area of adhesive rigid epoxy polymer resin coating-post contact is necessarily relatively small. The poor reliability of such epoxy seals has apparently been due, at least in part, to poor bonding at the rigid adhesive epoxy polymer resin coating post interface, between the rigid adhesive epoxy polymer resin coating and the lead or lead alloy of which the post is fabricated.

A variation on the old threaded post approach disclosed by vinal is presented in U.S. Pat. No. 4,245,014 in which the post itself is not initially threaded; rather a self-threading or self-tapping, sealant-containing member or nut is forceably threaded onto the post, cutting threads into the lead or lead alloy post and releasing sealant while engaging the post. This is combined with a case cover having a depression formed about the post orifice, which depression is filled with epoxy after the sealant-containing member is threaded into engagement with the post. The post is also equipped with a shoulder for abutting the underside of the case cover depression; a rubber O-ring is positioned around the post, squeezed between the post shoulder and the underside of the case cover depression.

Yet another approach to the problem is disclosed in U.S. Pat. No. 4,522,899 where a synthetic plastic, preferably a modified polyolefin having elastomeric characteristics, is initially injection molded in an annular, toroidal O-ring-like configuration about a tapered post. The U.S. Pat. No. 4,522,899 approach relies on shrinkage of the injection molded synthetic polyolefin to provide a seal at the O-ring—post interface. Once the initial O-ring injection molding operation is complete, a second injection molding operation is performed, surrounding the annular, toroidal O-ring configured elastomeric polyolefin with a pot or cylindrical mass of a less elastic material, preferably the same plastic material as the battery case, specifically polyethylene or polypropylene. The pot or cylindrical mass of material is then heat or ultrasonically bonded to the battery case.

While the approach of the U.S. Pat. No. 4,522,899 has superficial attraction, the approach has not proved to be a satisfactory solution to the post sealing problem. The injection molding process by which the annular, toroidal, synthetic plastic O-ring is fabricated about the post does not produce a good seal at the post--synthetic plastic O-ring interface. Indeed, injection molding, being a fabrication process as opposed to a bonding process, has not yielded a satisfactory bond and associated seal between the molded-in-place synthetic plastic O-ring and the metal post. Moreover, the elastomeric materials specified, such as polypropylene, tend to pull away from the battery post as these materials solidify during post-molding cure.

Lead and lead alloys are difficult to bond to other non-lead based metals and to non-metallic materials. Lead oxidizes freely and, hence, always has a small film of lead oxide present, which inhibits bonding. Material selection for post seals is limited because lead corrodes in base environments. The post sealing problem is particularly acute at the positive terminal post in a lead-acid battery because porous lead peroxide forms at that terminal. The sulfuric acid electrolyte easily creeps through the porous lead peroxide. (Surface tension of the acid electrolyte causes the acid to creep across and along all kinds and configurations of surfaces.) The sulfuric acid eventually finds its way through the epoxy polymer resin--lead or lead alloy post interface provided in the newer post seal constructions or creeps around the gaskets and the like used in the older techniques. This results in a leak and/or crevice corrosion, leading to degraded battery performance and battery failure. Leakage about the post with currently used seal techniques may also result from damage to the post seal during battery handling, from gassing in the event the battery is overcharged or from capillary rise of electrolyte along the post.

Batteries are increasingly being used in stand-by applications, to supply power in emergencies for computer systems, telephone switching equipment and the like, in the event of a power dropout of failure of the electric utility. Such stand-by batteries represent a significant capital investment and must have a useful life of many, as opposed to several, years. The required extended life aggravates the problem of providing an adequate, reliable and long lasting post seal because of the longer period over which the corrosive environment in the battery has access to the post seal construction.

Japanese Pat. No. 57-103257 discloses a storage battery cell post sealing structure which includes a hollow river inserted in a gap in the battery cover. A conductive portion of the battery plate extends upwardly around and surrounds the hollow rivet. The conductive portion is surrounded by a porous elastic ring containing an epoxy thermosetting sealing agent consisting of ferrite. A conical head section of the rivet shaft inserted into the hollow river expands the hollow rivet circumferentially outwardly, which presses the hollow rivet against the conductive member and the elastic ring, thereby creating a seal.

United Kingdom Pat. No. 2,133,609 discloses an electric storage cell including a battery post extending upwardly through a hole in the lid of the battery. The lid of the battery has a concave well which contains an elastomeric O-ring extending around the battery post. A terminal strip similarly extends around the battery post on top of the O-ring, with a free end extending outwardly above the top surface of the battery lid. Epoxy resin fills the remainder of the concave well, sealing the battery post with only the free end remaining clear.

United Kingdom Pat. No. 2,084,390 discloses a gas and liquid-tight pole packing. A battery pole extends upwardly through a concave well formed in the battery lid. The well contains three layers of sealing material surrounding the battery pole. The lowermost layer consists of an acid resistant bicomponent resin, the intermediate layer consists of a hot-melt adhesive, and the upper layer consists of an acid resistant bicomponent resin.

U.S. Pat. No. 2,892,006 discloses terminal seals for alkaline electric batteries, wherein a terminal member extends upwardly through a gap in the metallic wall of the battery. Epoxy resin sealing layers circumferentially surround the upwardly extending terminal member and separate the battery casing wall and three sealing washers. One of the sealing washers is located on the inside the battery, while the remaining two sealing washers reside outside the battery, with one washer lying in a well in the top of the battery casing and the other washer lying on top of an adjacent washer in the well.

European patent application No. 113,399 discloses a gas and fluid tight battery having metallic poles, including a battery pole extending upwardly through a hole in a concavely shaped well in the top of the battery. A small water-tight seal surrounds the post at the gap in the battery lid well and an epoxy resin surrounds the remainder of the battery post extending through the well. An upwardly extending flange surrounds the epoxoy resin which in turn is surrounded by three O-rings.

German Pat. No. 3,230,628 discloses a battery post seal wherein a metallic battery post extends upwardly through a gap in the bottom of a well formed in the top of the battery. The exterior of the metallic post is covered with a metallic alloy which contacts an intermediate packing material in the form of O-rings or in the form of a single gasket surrounding the pole and the alloy.

German Pat. No. 1,213,904 discloses a battery post seal, which includes a metallic battery post extending upwardly through a hole in the battery lid. A leakproof dense substance surrounds the battery post along the length of the post extending through the gap. The post has a plurality of flanges which are covered with the dense liquid-proof substance, which in turn engages the corresponding flanges in the top of the battery.

German Pat. No. 1,934,017 discloses a battery having an upwardly extending separator with the top of the separator having an epoxy resin layer thereover. A terminal lies over the epoxy layer, and a portion of the terminal is sealed with a cover and molten packing material.

French Pat. No. 2,112,722 discloses a water-tight seal in batteries which includes a battery terminal extending through a hole in a molded battery lid. The terminal has a groove formed therein which is sized to receive a joint or gasket embedded in the molded lid, thereby creating a seal.

SUMMARY OF THE INVENTION

In one of its aspects this invention provides a lead-acid[2] battery with a case having an aperture for passage of a terminal post therethrough electrically connecting electrodes within the case to apparatus external of the battery, the terminal post extending through the aperture and having a rubber layer circumferentially surrounding the post proximate the aperture. The rubber layer is substantially devoid of plasticizers and fillers and is preferably at least about 0.005 to 0.010 inches thick. A rubber-bonding material, preferably epoxy polymer, fills an annular space between the rubber layer and the interior surface of the case defined by the aperture. While natural rubber is preferred, the rubber layer may be either natural or synthetic and is preferably applied using a liquid carrier such as a synthetic nitrile rubber solvent, preferably a ketone-based rubber solvent containing from about 20% to about 35% by weight rubber solids dissolved therein, and in any event containing sufficient rubber solids to produce the rubber layer of desired thickness. The rubber layer is preferably vulcanize-bonded to the post after the liquid carrier has been removed, preferably by evaporation.

The invention also encompasses a method of securely sealing a battery post within an aperture passing through a lead-acid battery case by applying a liquid carrier having rubber solids dissolved therein as an undercoat annularly about the battery post portion which is most proximate the aperture when the post is securely sealed within the aperture; removing the liquid carrier portion of the undercoat from the battery post, preferably by evaporation; positioning the post within but preferably at least slightly annularly spaced from the aperture with the remaining now solid annular rubber undercoat proximate the aperture; filling space within the aperture between the annular rubber undercoat and the battery case with a rubber bonding, preferably epoxy, solid material thereby bonding to the rubber annular undercoat and to the battery case.

In the method the liquid carrier portion of the rubber undercoat is preferably a volatile synthetic nitrile rubber solvent cement, particularly a ketone-based solvent, preferably with about 20% to about 35% by weight rubber solids dissolved therein and in any event with sufficient rubber solids dispersed or dissolved therein to provide a rubber undercoat layer of desired thickness of at least about 0.005 to about 0.010 inches. The liquid carrier-rubber solids undercoat is applied, preferably by brushing, to the post and allowed to dry or forceably dried, to remove the liquid carrier, before the space is filled with the rubber bonding epoxy material.

The method further optionally and preferably encompasses heating the post portion after applying the rubber undercoat, to vulcanize-bond the solid annular rubber undercoat layer to the post portion, prior to filling the annular space with the rubber-bonding epoxy material. The heating to vulcanize-bond the solid annular rubber undercoat layer to the metal post portion is preferably, but not necessarily, performed after the liquid carrier component of the undercoat has been removed.

The invention further encompasses a method of corrosive-liquid tight sealing a metal member within an aperture passing through a thermoplastic wall by applying a rubber undercoat, having a volatile liquid carrier component with rubber solids dispersed therethroughout, annularly about the metal member portion which is to be proximate the aperture when the metal member is sealed therewithin; removing the liquid carrier component of the rubber undercoat, preferably by evaporation, from the metal member to leave an annular rubber coating on the metal member where the rubber undercoat had been applied; heat curing the annular rubber coating at a temperature sufficient to cross-link and bond the molecules of the rubber coating; positioning the metal member with and annularly spaced from the aperture with the rubber coating proximate the aperture; and filling the aperture between the rubber coating on the metal member and the wall with a rubber-bonding and thermoplastic material-bonding epoxy material thereby bonding the epoxy material to the rubber coating on the metal member and to the thermoplastic wall and producing a corrosive-liquid-tight seal between the metal member and the thermoplastic wall material at the aperture through the wall.

BRIEF DESCRIPTION OF THE DRAWINGS

FIG. 1 is a schematic representation of a battery post seal construction embodying aspects of the invention.

FIG. 2 is a broken front elevation view, partially in section, showing a lead-acid battery post seal construction embodying aspects of the invention.

FIG. 3 is a schematic block representation of a method of manufacturing an improved lead-acid battery post seal construction according to the invention.

FIG. 4 is a schematic block representation of another method of manufacturing an improved lead-acid battery post seal construction according to the invention.

DESCRIPTION OF THE PREFERRED EMBODIMENTS AND THE BEST MODE KNOWN FOR THE PRACTICE OF THE INVENTION

Referring to the drawings, FIG. 1 schematically shows a lead-acid battery post seal assembly and construction manifesting the invention. The post seal assembly is designated generally 10 and includes a post designated generally 12. Bonded to the exterior surface of post 12 is a thin rubber layer or undercoat portion 26. Surrounding rubber layer 26 is a portion of preferably poured-in-place epoxy material 50, selected to have excellent rubber-bonding and thermoplastic material-bonding properties. Epoxy material 50 occupies space between thin rubber layer 26 and battery case 16 and bonds effectively to case 16. Post 12 is preferably cylindrical and protrudes generally outwardly of the battery case through a circular aperture 20, with the battery case being designated generally 16. The extremity of post 12 within the battery is suitably configured for electrical connection to the battery electrodes; the configuration of the interior extremity of post 12 is not critical to the invention and hence has not been illustrated in FIG. 1.

The description of FIG. 1 hereinfollowing sometimes refers to components shown in the drawing and particularly to post 12 as being "vertically disposed" and "extending vertically" out of the battery. While this is the most common orientation of post 12, the invention is not limited to any particular position, orientation or configuration of post 12 with respect to the remainder of the battery.

In FIG. 1, rubber layer 26 has been illustrated completely separating post 12 from epoxy material 50, at all positions within an envelope defined by the battery case exterior. This is in accordance with the preferred practice of the invention, namely to provide as large an interface as possible between rubber layer 26 and epoxy material 50, as large an interface as possible between rubber layer 26 and post 12 and as small an interface as possible (indeed, if possible, no interface) between post 12 and epoxy material 50 within the envelope defined by the battery case exterior. At the battery case exterior, it is desirable to have epoxy material 50 annularly contacting post 12 for aesthetic reasons. Hence, considering the vertical orientation of post 12 in FIG. 1, epoxy material 50 will normally be just slightly higher about post 12 than the maximum height on post 12 of rubber layer 26, with epoxy material 50 thereby having a very small annular interface with post 12, just at or outside the envelope defined by the battery case exterior.

Referring to FIG. 2, there is shown a commercial version of a battery post seal assembly and construction manifesting the invention. Parts corresponding to those shown in FIG. 1 are identified with corresponding numerals, using prime notation. The post seal assembly is designated generally 10' and includes a post designated generally 12'. Post 12' has a preferably cylindrical portion 14' protruding generally outwardly of the battery case, with the battery case being designated generally 16'. Post 12' also has a second preferably generally cylindrical portion 18, of preferably larger diameter than portion 14'. Portion 18, when the assembly is in its finished state as illustrated in FIG. 2, is proximate a preferably circular aperture 20' in case 16' within which post 12' resides and through which post 12' protrudes to the battery exterior. The lower extremity of portion 18 is suitably configured for electrical connection to the battery electrodes; the configuration of the lower extremity of portion 18 is not critical to the invention.

Aperture 20' is preferably formed in a cup-like depression 22 of case 16', as illustrated. Aperture 20' is of only slightly larger diameter than the cylindrical portion 18 of post 12'. The extreme bottom portion of depression 22, designated 24 in the drawing, is of generally annular configuration and extends a short distance radially outwardly from preferably circular aperture 20'. The cylindrical surface defining aperture 20' which faces post 12' is designated 28. The maximum or outer overall diameter of depression extreme bottom portion 24 is preferably only slightly greater than the sum of twice the thickness of the battery case plus the diameter of the cylindrical portion of the post where it passes through aperture 20'; this produces a construction of bottom portion 24 of excellent strength.

Extreme bottom portion 24 of depression 22 curves at its radially outboard extremity 25 to a vertical or axial disposition, to define a vertical or axial annular wall 40 of relatively short axial length. This annular wall, at its opposite extremity 41 closer to the battery exterior, joins a laterally extending annular ring-like structure 42 defining an intermediate bottom or shelf of depression 22. Annular shelf 42 may curve upwardly at its outboard extremity to define another annular ring-like structure 44 which, at its opposite extremity, may join the battery case top 16, as shown at the right side of FIG. 2, or may join a reinforcing lug portion formed at the edge of the battery case top, as shown at the left side of FIG. 2, where the reinforcing lug houses mating means for joining the battery case top to the remainder of the battery case. This configuration of cup-like depression 22, in combination with epoxy material filling depression 22 and the rubber layer about post 12, provides high strength construction.

An O-ring 60 is positioned axially on cylindrical portion 18 to rest on extreme bottom portion 24 of depression 22, to be squeezed between cylindrical portion 18 and annular wall 40 when post 12' is installed. O-ring 60 provides a dam or seal at the bottom of cup-like depression 22, preventing leakage of epoxy material into the battery interior when the epoxy material is poured into cup 22 to secure post 12' in place. If the fit between post 12' and aperture 20' is sufficiently close that epoxy material 50' cannot flow through any clearance between post 12' and cylindrical surface 28 of aperture 20' facing post 12', O-ring 60 may be eliminated.

Depression 22 defines a cup for receiving an epoxy material having good rubber bonding and thermoplastic material bonding properties; the epoxy material is designated 50' in the drawing. Epoxy material 50' is preferably a thermosetting epoxy.

Prior to installing post 12' in the battery case, thin rubber layer 26' is applied to the annular exterior of portion 18 of post 12', preferably by brushing. One preferable way of applying rubber layer 26' is to brush a synthetic nitrile rubber solvent or solvent cement onto portion 18 of post 12' where the solvent or solvent cement is a ketone-based solvent preferably containing from about 20% to about 35% by weight rubber solids dissolved in solution. The rubber may be synthetic nitrile rubber or natural rubber. The solution is allowed to dry and when dry, evaporation of the ketone-based solvent leaves the rubber solids bonded to cylindrical portion 18 of the post. Using this technique a rubber layer 26' of from 5 to 10 mil (0.005–0.010 inch) thickness on post 12' results. If desired, and it is highly desirable to do so, the rubber layer material 26 may be further polymerized and cross-linked and effectively vulcanized by heating the post after the rubber-solvent solution has been applied; this further polymerizes and cross-links the rubber molecules and results in substantially increased strength of the bond at the rubber layer 26'—post 12' interface. Such vulcanizing also has another advantage—it greatly improves the resistance of rubber layer 26' to chemical attack, such as attack from the acidic electrolyte within the battery case. No sulfur need be added as in conventional vulcanizing processes; however, small amounts of sulfur in the solvent may enhance the vulcanizing of the rubber.

Referring to FIGS. 3 and 4 of the drawings, the method of the invention has applicability to sealing any metal member, but particularly lead and lead alloy members, within an aperture passing through a thermoplastic wall where the thermoplastic wall contains a corrosive, particularly an acidic liquid, environment. As illustrated, the method begins by application of a rubber undercoat solution, having a liquid carrier component with rubber solids, preferably natural or nitrile rubber solids dissolved therein, annularly about the metal member of interest. The undercoat solution is applied annularly about the metal member, to the portion of the metal member which is going to be proximate or adjacent to the aperture through the wall when the metal member is sealed in place. The undercoat solution has sufficient rubber solids dissolved or dispersed therein to leave a rubber layer of at least from about 0.005 to about 0.010 inches thick when the liquid carrier is not present. The liquid carrier is preferably applied by brushing on to the metal post. Of course, dipping, spraying and similar application techniques are also within the purview of the invention.

The liquid carrier should not contain any significant amount of rubber filler materials, plasticizers or other dissolved solids (other than the rubber).

After the undercoat solution has been applied, the liquid carrier is removed from the metal post, preferably by allowing the undercoat solution to dry, with the liquid carrier portion of the undercoat solution evaporating. The liquid undercoat solution may be forceably dried and may be heated to accelerate the drying and evaporation; such heating may also accelerate the desirable polymerization and cross-linking of the rubber solids molecules. If the rubber undercoat solution had a sufficiently high concentration of rubber solids, preferably about 20% to about 35% by weight, a rubber layer of about 0.005 to about 0.010 inches thickness results on the metal member. Use of higher concentrations of dissolve rubber solids and/or multiple applications of the undercoat solution will produce an even thicker rubber layer.

The rubber layer may then optionally and preferably be heat cured or vulcanized, by heating the metal member to a temperature of between 400° F. and 500° F. The vulcanization can also be preformed by applying heat directly to the rubber, as in an oven. No pressure is required to be applied and no sulfur is needed, as is the case with conventional vulcanizing processes. The heat curing apparently further polymerizes and cross-links the rubber molecules, producing an exceptionally strong bond at the rubber-metal interface.

The lead alloy or other metal post member is then placed in the aperture where the seal is to be formed and thermosetting epoxy material, having excellent rubber-bonding and excellent thermoplastic material-bonding properties, is then filled between the rubber layer and the thermoplastic wall. The thermosetting epoxy material bonds to both the rubber layer and to the thermoplastic wall, creating a corrosive-liquid-tight seal about the metal post member and securely retaining the metal post member within the aperture.

The rubber layer 26, which is sometimes referred to herein as an "undercoat" to indicate that rubber layer 26 is applied to post 12 prior to securing post 12 in position by pouring epoxy material 50 into place around post 12, may be applied to the post at the last stage of assembly of the battery or may be applied to the post at an earlier stage, when the post is a free-standing part. Using this second technique, the rubber is polymerized and vulcanized fortuitously as the battery is assembled and the lower portion of the post is bonded to the internal battery electrodes by heating, specifically by flame applied to two abutting pieces of lead or lead alloy, namely the lower portion of the battery post 12 and the lugs of the electrode plate within the battery. When this technique is used, the rubber layer reaches a temperature of between 400°–500° F., at which vulcanization occurs. When such flame bonding of the lead or lead alloy parts is used, the post portion having the rubber layer applied thereto is protected from contact with the flame using a suitable shield. Other methods of applying heat to the rubber-post interface to effectuate the improvement in the bonding of the rubber to the post may also be used. The use of the heat from the flame bonding of the lead or lead alloy parts is especially desirable since this results in energy saving.

The rubber used to form layer 26 according to the invention is preferably natural raw rubber, i.e. cis-polyisoprene, or a synthetic rubber such as polyarcylonitrile, polychloroprene, and the like, similar to natural latex. Surface preparation of post 12 is relatively important; the post must be reasonably clean and free of grease and other materials which would tend to block the solvent and the dissolved rubber particles carried by the solvent from contacting the raw metal surface. When the rubber is placed in the solvent and dissolved and then applied to the post, this produces intimate contact between the raw rubber and the lead or lead alloy surface. Indeed, the rubber has been found to bond adequately to the lead or lead alloy merely by allowing the solvent carrying the rubber to evaporate, leaving a thin layer of rubber in place annularly about the lead or lead alloy post. However, to achieve the best results, it is necessary to apply heat to the rubber and to the rubber—post interface, to effectively vulcanize the rubber to the lead or lead alloy post and to further cross-link and bond the rubber molecules.

The invention may be effectively practiced with lead or lead alloy battery posts; specifically, the invention has been found to function quite effectively with lead-antimony, lead-calcium and lead-calcium-tin alloys conventionally used for battery posts.

While the invention has been described with a ketone-based rubber solvent being specified as preferable for the carrier, any suitable rubber solvent which is volatile and which will dry and evaporate when applied to the post, leaving the base rubber on the post, can be used. Also, liquid carriers which are not rubber solvents may be used, with rubber solids dispersed therethroughout.

The heat and resultant vulcanization of the rubber seems to result in a transformation of the rubber, cross-linking the rubber molecules, much like the process observed in polymerization of synthetic plastic monomers. In this regard it is to be understood that in practicing the invention, it is not necessary to apply pressure to the rubber layer 26—post 12 assembly when heating to produce the vulcanization; indeed, in the preferred practice of the invention no pressure is utilized.

While the invention has been described in terms of applying rubber 26 to the battery post 16 in the form of a thin layer, the layer applied to the battery post need not be thin; a thick layer may also be produced using the invention. In practicing the invention, pure rubber is preferably used, without any filler added to the rubber material. Either natural or artificial rubber may be used. In addition to natural rubber obtained from traditional rubber trees, natural substitutes such a gutta percha and balata are believed suitable for use in practicing the invention. Nitrile rubber has proved particularly well adapted to the invention; neoprene-type rubbers and trichlorinated ethylene-type rubbers may also be used and it is envisioned that any type of rubber which can be cross-linked, such as by heating or by vulcanizing, can be advantageously used to practice the invention.

While, as noted, it is desirable to maximize the size of the interface between battery post 16 and rubber 26 in the context of the invention in order to provide maximum strength and sealing at the post seal, the invention has been found to function quite acceptably when rubber 26 has been applied along only a relatively short axial length of the battery post and an epoxy-metal post interface has been permitted above and/or below the rubber layer.

In laboratory tests, battery post seals fabricated according to the invention substantially as disclosed in FIG. 2 have been compared with battery post constructions representative of the best of the prior art. In accelerated tests batteries according to the invention and batteries according to the best of the prior art post seal constructions were both exposed to temperatures of 125 degrees Fahrenheit and 2.60–2.65 volts polarization for a period of four weeks. After the four week test period, the batteries according to the invention exhibited no acid electrolyte leakage at the post seal while the batteries having post seal constructions according to the prior art consistently displayed acid electrolyte creepage at their post seals.

Surprisingly, in fracture tests, post seals embodying the invention have been found to be strongest at the metal—rubber interface. Prior art seals having a metal—epoxy interface can be easily broken by hand, with fracture failure occurring at the epoxy—metal post interface. Post seals according to the invention, unlike the prior art seals, cannot be fractured by hand. In fracture tests of post seals embodying the invention, when the post seal assembly is struck with a hammer, fracture surprisingly occurs through the epoxy, not at the rubber—metal post interface, not at the rubber—epoxy interface and not at the epoxy—thermoplastic material battery case interface.

What is claimed is:

1. A lead-acid battery comprising:
   a. a case having a apertured cover, said aperture being for passage of a terminal post therethrough for electrically connecting electrodes within said case to apparatus external of said battery;
   b. said terminal post extending through said aperture;
   c. a rubber layer, devoid of rubber filler, circumferentially surrounding said post proximate said aperture;
   d. a rubber-bonding epoxy polymer between said rubber layer and said aperture through said case.

2. The battery of claim 1 wherein said rubber layer is synthetic nitrile rubber.

3. The battery of claim 1 wherein said rubber layer is natural rubber.

4. The battery of claim 1 wherein said rubber layer is vulcanize-bonded to said post.

5. The battery of claim 1 wherein said rubber layer is between about 5 and about 10 mils thick.

6. The battery of claim 1 wherein said rubber layer extends axially along said post, separating said post from said epoxy material along the axial length of said post below the level of the battery case surface.

7. A lead-acid battery comprising:
   a. a case having a apertured cover said aperture being for passage of a lead alloy terminal post therethrough for electrically connecting electrodes within said case to apparatus external of said battery;
   b. said terminal post extending through said aperture;
   c. a natural rubber layer of from about 0.005 to about 0.010 inches thick and devoid of rubber fillers, circumferentially surrounding and vulcanize-bonded to said post in the neighborhood of said aperture;
   d. a rubber-bonding epoxy polymer resin between said rubber layer and said aperture through said case, bonded to said rubber layer circumferentially thereabout and to said battery case circumferentially about said aperture;
   e. said rubber layer extending axially along said post, separating said post from said rubber-bonding epoxy material along the axial length of said post interior of said case.

8. A lead-acid battery comprising:
   a. a thermoplastic case having a concave cup-like depression formed in the case exterior with an aperture through said case at the bottom of said depression, said aperture being for passage of a lead alloy terminal post therethrough for electrically connecting electrodes within said case to apparatus external of said battery;
   b. said lead alloy terminal post extending through said aperture;
   c. a vulcanized cylindrical rubber layer, devoid of rubber fillers and plasticizers, of from about 0.005 to about 0.010 inches thick, circumferentially surrounding, vulcanize bonded to and axially extending along said post substantially the depth of said concave depression at said aperture;
   d. a rubber-bonding and thermoplastic material-bonding epoxy polymer occupying said depression and annularly surrounding said cylindrical natural rubber layer on said post, bonded to said rubber layer over substantially the axial length thereof within said depression and bonded to said concave depression portion of said thermoplastic case over substantially the entire concave surface of said depression.

9. The battery of claim 8 wherein said rubber layer is natural rubber.

10. The battery of claim 8 wherein said rubber layer is synthetic rubber.

11. A lead-acid battery comprising:
   a. a case having a apertured cover, said aperture being for passage of a terminal post therethrough for electrically connecting electrodes within said case to apparatus external of said battery;
   b. said terminal post extending through said aperture;
   c. a heat-cured elastomeric layer, devoid of fillers and plasticizers, circumferentially surrounding said post proximate said aperture;
   d. an epoxy polymer bonded to said elastomeric layer, filling space between said elastomeric layer and said aperture through said case, bonded to said case about said aperture.

12. The battery of claim 11 wherein said elastomeric layer is balata.

13. The battery of claim 11 wherein said elastomeric layer is gutta percha.

14. The battery of claim 11 wherein said elastomeric layer is a natural material.

15. The battery of claim 11 wherein said elastomeric layer is a synthetic.

16. A lead-acid battery comprising:
   a. a case having a apertured cover, said aperture being for passage of a terminal post therethrough for electrically connecting electrodes within said case to apparatus external of said battery;
   b. said terminal post extending through said aperture;
   c. a rubber layer, circumferentially contacting said post proximate said aperture;

d. a rubber-bonding epoxy polymer fluid-tightly filling space between said rubber layer and said aperture through said case.

17. A lead-acid battery comprising:
a. a case having a apertured cover, said aperture being for passage of a terminal post therethrough for electrically connecting electrodes within said case to apparatus external of said battery;
b. said terminal post extending through said aperture and comprising at least about fifty percent lead by weight;
c. a heat-cured cross-linked elastomeric layer, vulcanize heat-bonded to and circumferentially contacting said post proximate said aperture;
d. an epoxy polymer bonded to said elastomeric layer, filling space between said elastomeric layer and said aperture through said case, bonded to said case about said aperture.

* * * * *